Figure 1:
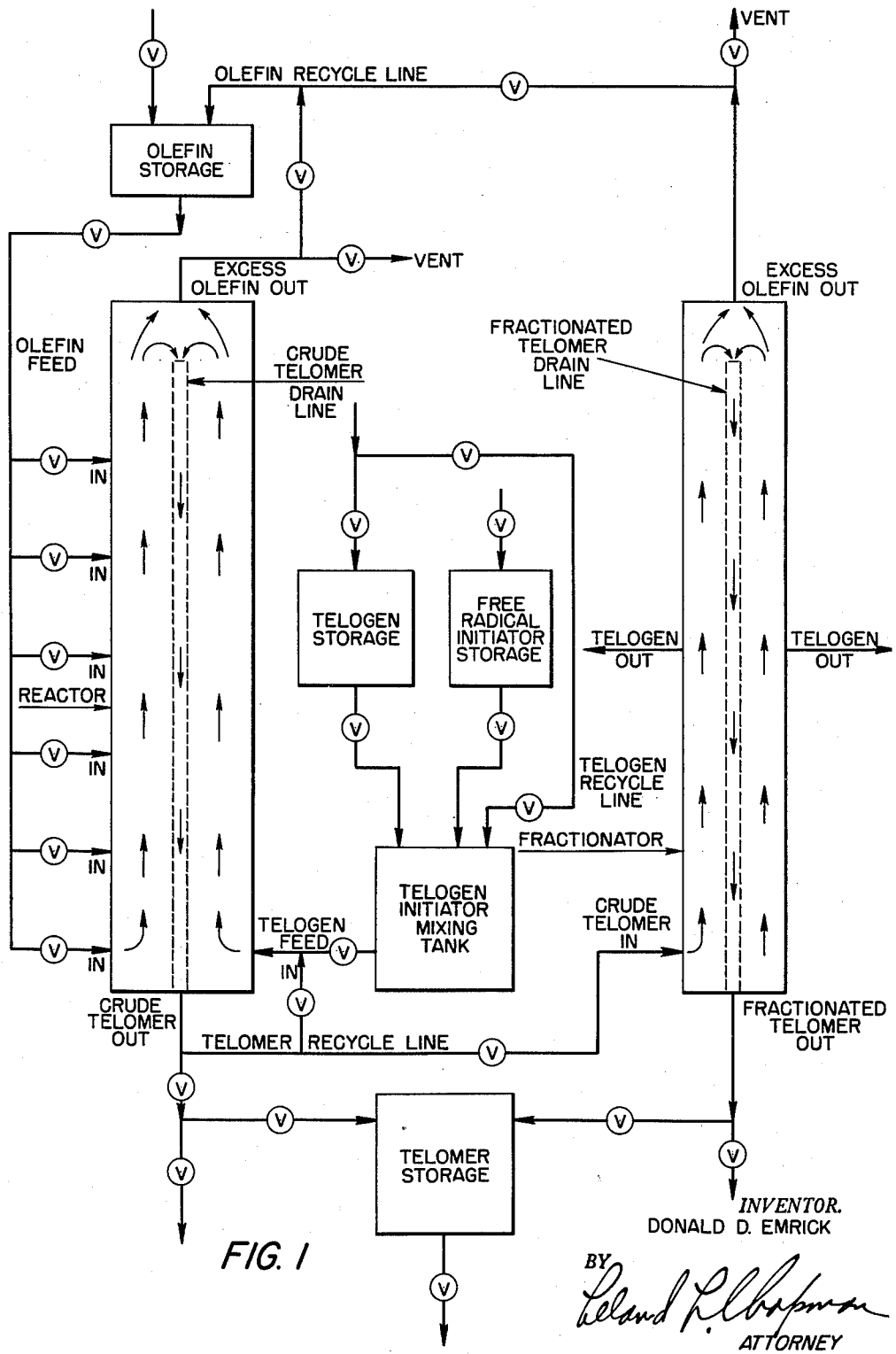

INVENTOR.
DONALD D. EMRICK

United States Patent Office 3,100,792
Patented Aug. 13, 1963

3,100,792
PROCESS FOR PREPARING HIGHER HOMOLOGUES OF ORGANIC COMPOUNDS HAVING A LABILE HYDROGEN ATOM
Donald D. Emrick, Shaker Heights, Ohio, assignor to The Standard Oil Company, Cleveland, Ohio, a corporation of Ohio
Filed May 4, 1960, Ser. No. 26,775
17 Claims. (Cl. 260—462)

This invention relates to a process for preparing homologues of organic compounds having a labile hydrogen atom and containing only atoms from the group of carbon, hydrogen, halogen and oxygen, and particularly, to a process for preparing branched chain homologues two or more carbon atoms higher than the starting organic compound by addition of the compound to an α-olefin, and to apparatus for carrying out this process.

A number of synthetic reactions are available in organic chemistry for the preparation of higher homologues of organic compounds. It is possible, for example, to add $CH_2$ to alcohols by way of the halide, cyanide, and amine, and thence to OH using nitrous acid. However, this procedure gives quite poor yields, particularly in the last step, has too many steps to make it practical commercially, and gives only one $CH_2$ per cycle. It is also possible to prepare higher homologues by the Grignard reaction, but as is well known, the Grignard reagents are expensive, and furthermore, in many cases, particularly where there is a large amount of branching in the product, give side reactions, such as olefin formation, which materially cut the yield. In extreme cases, it may even be impossible to obtain a significant amount of the desired product, because of the competing side reactions.

Olefins undergo a reaction known as telomerization, which has been described in numerous patents and publications. This involves the reaction of the olefin, called a taxogen, with a fragment of another molecule, known as a telogen, and the product of this reaction is called a telomer. The reaction can be defined by the following equation:

(I)
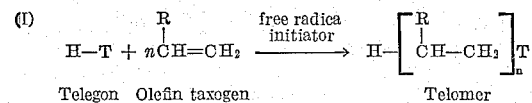

Telogen  Olefin taxogen                    Telomer

R is hydrogen or an alkyl, aryl, mixed alkyl aryl, mixed aryl alkyl, or cycloalkyl radical.

Telomers are materials of rather high molecular weight, and are different from copolymers and interpolymers. Copolymers and interpolymers contain a number of each of two or more different monomer units in the main polymer chain, whereas the fragments of another molecule (the telogen) in telomers appear as units at the terminal of the main polymer chain. Telomerization differs from simple free radical addition to the double bond of an olefin in that more than one molecule of the olefin appears in the product. The telomerization reaction proceeds in the presence of a free radical initiator which removes an active hydrogen from the telogen. The resulting radical initiates the telomerization by adding to the double bond of the olefin.

One of the difficulties in telomerization is the control of the molecular weight of the final product. The product ordinarily contains a large assortment of molecules of varying molecular weight, many quite high, usually of the order of several hundred to several thousand, resulting from reaction of the olefin with the telogen during the telomerization.

It is apparent from Equation I that if the olefin is ethylene, and only one mole of olefin adds to one mole of telogen, the product would be the second next higher homologue of the telogen. Higher olefins would give correspondingly higher homologues of the telogen per addition. Such a mole-for-mole addition would not be a telomerization of the ordinary sort, because of the limitation on the number of moles of the α-olefin per molecule of the telomer. However, it would proceed via the mechanism of addition of a true telomerization, and would be analogous to this extent. No method is yet known, however, of controlling the reaction so as to limit the number of moles of the α-olefin per mole of telogen in the telomer.

The instant invention supplies a way of controlling this telomerization reaction so as to confine it substantially to addition of α-olefin to telogen mole-per-mole, or, at most, two moles per mole. To distinguish this form of telomerization from the usual type of telomerization reaction, it is referred to hereinafter as "addition telomerization." The product is not a true telomer in the usual sense, because of its low molecular weight, and is referred to herein as an "addition telomer."

The addition telomerization process in accordance with the instant invention makes possible the preparation of higher homologues of telogens having two or more methylene units than the starting telogen, the smallest olefin being ethylene. Correspondingly higher α-olefins would give correspondingly higher homologues of the telogen. The process is particularly advantageous in the preparation of highly branched higher homologues of telogens.

Self-polymerization of the olefin taxogen during addition telomerization is prevented by employing a very great excess of telogen to olefin throughout the reaction. The molar ratio of telogen:olefin should be within the range from 100:1 to 1000:1, in order to ensure that only addition telomerization occurs. The reaction proceeds in the presence of a free radical initiator of the type used in conventional telomerization, and is surprisingly rapid, so that it is adapted to be carried out in a continuous reaction system, such as would be desired in a commercial synthesis. The product is an addition telomer containing one or two moles of α-olefin in the form of an alkyl group attached to the telogen at the site of the active hydrogen.

FIGURE 1 shows in schematic outline a typical arrangement of apparatus for carrying out the addition telomerization in a continuous, semi-continuous, or batchwise system.

The invention is applicable to any organic compound active as a telogen, other than a hydrocarbon, containing only atoms selected from the group consisting of carbon, hydrogen, boron, halogen and oxygen, and having at least one labile hydrogen atom, preferably tertiary. Hydrogens attached to a carbon bearing an oxygen or halogen ligand or carboxylate group will usually be labile, particularly if the hydrogen is tertiary.

The telogen can be defined by the following general formula:

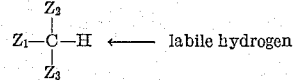

where $Z_1$, $Z_2$ and $Z_3$ are organic radicals, no more than one of which can be hydrogen, and selected from the group consisting of hydrogen, aliphatic, aromatic, mixed aliphatic-aromatic, cycloaliphatic and heterocyclic radicals, ester, alcohol, ketone, aldehyde, acetal, ketal, anhydride, acid, acid halide, lactone, halogen and ether groups, and organic radicals including such groups. The Z radicals are attached through carbon or oxygen to the carbon atom to which is attached the labile hydrogen, and may themselves contain additional labile hydrogens. Ordinarily, the Z radicals will have from one to about thirty carbon atoms, but there is no upper limit as to operativeness, since the reaction of the invention will proceed with any organic compound regardless of molecular weight having a labile hydrogen atom as shown in the formula.

Typical $Z_1$, $Z_2$ and $Z_3$ radicals are methyl, ethyl, n-propyl, isopropyl, n-butyl, isobutyl, secondary butyl, tertiary butyl, n-amyl, isoamyl, tertiary amyl, n-hexyl, isohexyl, 2-ethylhexyl, n-heptyl, tert-heptyl, n-octyl, iso-octyl, tert-octyl, n-nonyl, tert-nonyl, n-decyl, tert-decyl, phenyl, xylyl, benzyl, beta-phenylethyl, alpha-phenylethyl, tolyl, ethylphenyl, dimethylphenyl, cyclohexyl, methylcyclohexyl, cyclopentyl and cycloheptyl radicals, hydroxyl, carbonyl, carboxyl, acid halide, carboxylic ester, anhydride, aldehyde, lactone, acetal, ketal, ether, and halogen groups, and any of the above radicals including such groups either alone or in admixture.

The cyclic Z radicals can be taken as such or they can be condensed with each other and with the carbon containing the labile hydrogen atom to form a ring such as aromatic, mixed aliphatic aromatic, cycloaliphatic and heterocyclic rings, and such rings containing any of the oxygen-containing and halogen groups mentioned above.

Additional $Z_1$, $Z_2$ and $Z_3$ radicals are illustrated in the following list of telogens:

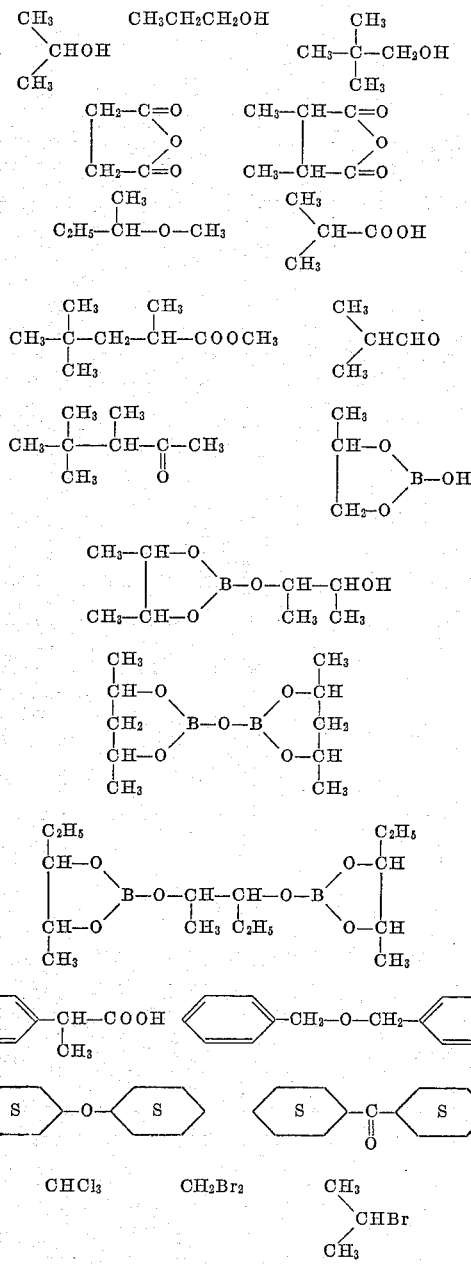

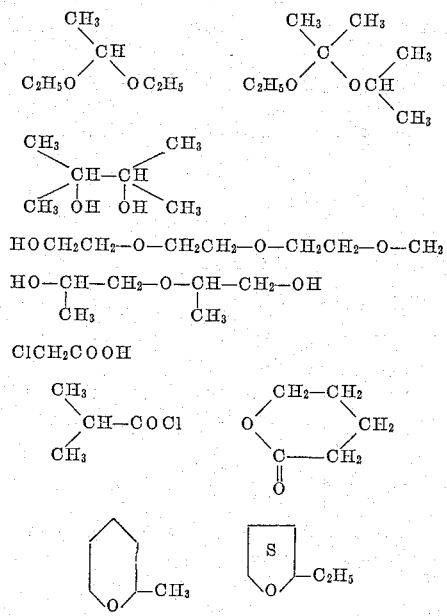

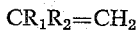

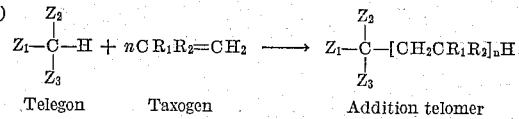

The taxogen has the general formula:

$$CR_1R_2=CH_2$$

where $R_1$ and $R_2$ are hydrogen or aliphatic, aromatic or cycloaliphatic radicals having from one to about sixteen carbon atoms. These are referred to for convenience hereinafter as α-olefins. The olefin is selected according to the number of carbon atoms and the type of group, whether branched or straight chain, or cyclic, that it is desired to add to the telogen molecule at the carbon bearing the labile hydrogen. Monoalkyl ethylenes usually are more reactive than more highly branched olefins. Ethylene reacts quite readily.

Typical R radicals are phenyl, methyl, ethyl, isobutyl, n-hexyl, n-amyl, n-butyl, n-propyl, isopropyl, cyclohexyl, cyclopentyl, benzyl, methyl phenyl, ethyl phenyl, n-decyl, n-dodecyl, n-tetradecyl, and methyl cyclohexyl.

The telogen and taxogen are believed to react according to the following equation:

(II)
$$Z_1-\underset{Z_3}{\overset{Z_2}{C}}-H + nCR_1R_2=CH_2 \longrightarrow Z_1-\underset{Z_3}{\overset{Z_2}{C}}-[CH_2CR_1R_2]_nH$$

Telogen     Taxogen           Addition telomer

In the above formula, $R_1$, $R_2$, $Z_1$, $Z_2$ and $Z_3$ are as defined hereinbefore, and $n$ is the number of moles of olefin attached to the telogen, and is one or two or an average thereof.

It is apparent that branched addition telomers are obtainable, because of the attachment of the olefin unit at the site of the labile hydrogen. Tertiary structures otherwise difficult of access are readily obtained by this reaction.

The reaction mechanism has been tentatively confirmed by infrared analysis of the addition telomer. When the telogen contains two or more hydrogen-reactive sites, the addition telomerization may occur at any or all of such sites, although usually at only one, depending upon the reaction conditions and the amount of olefin and free radical initiator available for the addition telomerization.

The reaction requires a free radical initiator, and this substance can be any of those well known to those skilled in the art as useful in the conventional telomerization of olefins. It should be sufficiently active to decompose freely into free radicals under the reaction conditions which can be employed.

An initiator is required which is capable of depriving the telogen of its active hydrogen, and starting the series of reactions which leads to the addition telomer. Free radicals are required which are active at temperatures well below the boiling point of the telogen employed and which are permissible in the addition telomerization reaction. Furthermore, the telomerization reaction chain is halted by conventional free radical inhibitors, and the reactants should be relatively free from such inhibitors.

Initiators which may be used include diacyl peroxides such as diacetyl peroxide, dipropionyl peroxide, dibutyryl peroxide, dilauroyl peroxide, acetyl benzoyl peroxide, and dibenzoyl peroxide; dialkyl peroxides such as di-tert-butyl peroxide, dihexyl peroxide, di-isopropyl peroxide, di-isobutyl peroxide, di-2-ethylhexyl peroxide, di-n-butyl peroxide, and diethyl peroxide; diaryl or diarylalkyl peroxides such as dicumyl peroxide; perhalogen compounds such as hexachlorethane, and combinations thereof with dialkyl peroxides, organometallic compounds such as tetraethyl lead, tetraphenyl lead, and azo-N=N-compounds such as azobis(isobutyronitrile) and diazo-aminobenzene.

Di-tert-butyl peroxide is a preferred free radical initiator for use in this invention.

The stability of free radical initiators is customarily evaluated in terms of half-life at a stated temperature, and the following table compares this for several commercially available free radical initiators:

TABLE I

| Compound | Temp. (°C.) | Half life (hours) | Number moles of radical produced per pound |
|---|---|---|---|
| (1) Tetraethyl lead | | | 5.62 |
| (2) Lauroyl peroxide | 50 | 54.2 | 2.27 |
| | 70 | 3.4 | |
| | 85 | 0.5 | |
| (3) Dicumyl peroxide | 115 | 12.4 | 3.34 |
| | 130 | 1.8 | |
| | 145 | 0.38 | |
| (4) Di-tert-butyl peroxide | 100 | 218 | 6.20 |
| | 115 | 34 | |
| | 130 | 6.4 | |
| (5) Benzoyl peroxide | 70 | 13.0 | 3.74 |
| | 85 | 2.15 | |
| | 100 | 0.40 | |
| (6) 2-4,dichlorobenzoyl peroxide | 50 | 17.8 | 2.38 |
| | 70 | 1.41 | |
| | 85 | 0.25 | |
| (7) Azobis(isobutyronitrile) | 80 | 1.26 | 5.50 |

The reaction conditions can be widely varied, but it is important to use a high temperature and a very large excess of telogen.

In general, the reaction temperature should be well below the boiling point of the poorly volatile telogen, and should be selected such that the half-life of the free radical initiator employed is within the range from about 0.25 to about 5 hours, since such have been found to give the best results. By suitable modification of the reaction conditions, however, it may be possible to employ free radical initiators whose half-life is outside of this range.

At low temperatures, there is a greater tendency of the olefin to self-polymerize, increasing the number of moles of olefin attached to each molecule of the telogen at the site of the labile hydrogen. This tendency is greater when the olefin is in the liquid phase, or in solution in the reaction mixture in a high concentration, under the reaction conditions. Consequently, it is preferred to use a reaction temperature below the boiling point of the telogen and at which the olefin is largely in the gas phase, and select a free radical initiator which has an appropriate half-life under these conditions.

Furthermore, in the case of olefins which are in the gas phase at the reaction temperature, the solubility of the olefin in the reaction mixture is higher at lower temperatures. This results in a higher concentration of olefin in the reaction mixture than may be tolerable under the proportionate limits of olefin to telogen.

Accordingly, the preferred reaction temperature is above the boiling point of the olefin used and well below the boiling point of the slightly volatile telogen and one at which the free radical initiator decomposes to give a rapid liberation of a substantial amount of free radicals, but below that temperature at which a violent reaction leading to decomposition of the starting material and/or product would set in. Generally speaking, the preferred reaction temperature would be at least 30° C. below the boiling point of the telogen and be above that temperature at which the free radical initiator has a half-life of approximately one hour, down to about one-quarter hour. In general, the reaction temperature will be from about 80 to about 200° C.

For di-tert-butyl peroxide, for example, the table shows that the desired fast reaction would be obtained at about 145° C. to 160° C. without deleterious side effects. Lauroyl peroxide, on the other hand, can be used at temperatures of about 80° C. to 90° C. Dicumyl peroxide would be used at temperatures of from about 135 to 150° C.

If the reactants are liquids at the reaction temperature, no solvent is necessary, but dilution may be desirable to maintain control of the reaction rate. However, a solvent for the unsaturated hydrocarbon will assist in bringing it into contact with the telogen, and it may be necessary because of this facilitation of the reaction to use less olefin in the reaction mixture. When the telogen is a solid, a solvent may be desirable to expedite the reaction.

Usually, no solvent is employed; however, if a solvent is employed, it should be inert under the addition telomerization reaction conditions. Suitable solvents include benzene, cyclohexane, n-octane and iso-octane. Preferably, the reaction mixture is agitated.

The reaction time will depend upon the initiator and the reactants, the concentrations thereof, and the reaction temperature. It is usually convenient to employ reaction conditions such that the reaction can be complete in less than ten hours, but of course, this is not always a matter of choice, and reaction times as long as thirteen to fifty hours may not be out of line, depending upon the need.

The telogen concentration on a molar basis should be at least about 100 times as great as that of the olefin at a given time, and preferably, at least 250:1. At molar concentrations beyond 1000 telogen to 1 of olefin, the reaction becomes rather slow, and therefore, this is a practical upper limit on the dilution of the olefin. Increasing the reaction temperature has much the same effect as decreasing the concentration of the olefin, and therefore, low concentrations of telogen to olefin can be somewhat offset by using a higher reaction temperature.

The reaction may be easily carried out in conventional equipment. A suitable reaction system for carrying out the reaction is shown in FIGURE 1. The ingredients may be brought together in any order. In the apparatus shown, the telogen and the free radical initiator are mixed, and are then blended with the olefin.

The system of FIGURE 1 is adapted for continuous, semi-continuous or batchwise operation, as suited to the need of the particular addition telomerization. However, continuous or semi-continuous operations are preferred, because optimum conditions are more difficult to maintain in a batch operation.

The apparatus of FIGURE 1 is composed of an olefin storage tank, telogen storage tank, free radical initiator storage tank, a mixing tank for the last two, and a reactor, as the essential components. Also included are optional components are a fractionator for stripping unreacted ingredients from the crude telomer product, and a telomer storage tank. The telogen-free radical initiator feed is mixed with olefin in the reactor, and held there at the desired reaction temperature. The reaction is desirably carried out by bubbling the olefin gas through the liquid telogen-free radical initiator mix held in the reactor. The addition telomer product, which may contain unreacted olefin and telogen, is withdrawn through an overflow pipe extending to the top of the reactor. The excess olefin can be recycled, stored, or vented to the atmosphere, as desired.

Crude addition telomer product may be withdrawn at the bottom of the reactor, depending upon the percent yield, which in turn is dependent upon the reaction conditions. In a semi-continuous operation, the crude addition telomer or a part thereof can be blended with additional feed and recycled, to ensure a more complete reaction. In a batch operation, the telogen reaction mix can be recycled for a period, then recycling halted, and then the reactor drained, for a new cycle.

The crude addition telomer from a continuous, semi-continuous or batch operation can be fractionated to remove excess olefin and telogen in the fractionator, or passed directly to storage, if it is sufficiently pure for use. Telogen and olefin recovered in the fractionator can be recycled.

The reaction can be carried out continuously in this system by continuously blending telogen and free radical initiator in the mixing tank, feeding it to the reactor, and withdrawing excess olefin, and the crude addition telomer product, which are then recovered in the desired manner with or without fractionation as required. The reaction conditions and the rate of feed of telogen and olefin are controlled, so that the dwell time in the reactor is sufficient to bring the reaction as far towards completion as possible.

Addition telomer homologues are obtainable having two or more carbon atoms than the telogen, depending upon the α-olefin employed. The reaction is versatile, being applicable to any organic compound containing only carbon, hydrogen, halogen, and oxygen, and a labile hydrogen.

The following examples, in the opinion of the inventor, represent the best embodiments of his invention. In the examples, the apparatus used was that shown in FIGURE 1.

*Example 1*

The reactor of FIGURE 1 was packed with helices, and filled with 350 parts of diethylene glycol di-isobutyrate (boiling point 130–134° C., 2 mm.). The reactor was brought to 145° C., and propylene gas then bubbled through the hot telogen from the inlet at the bottom of the packed column. A solution of 28.1 parts of di-tert-butyl peroxide in 252 parts of telogen, prepared in the mixing tank, was then also concurrently slowly added through the inlet for telogen feed at the rate of 2.92 parts by weight per minute. After all of the telogen-initiator concentrate had been added, the tank feed line was closed, and the crude addition telomer was continuously recycled through the telomer recycle line for an additional four hours, the olefin being added continuously all that time. The contents of the reactor were then transferred to the fractionator.

A total of 402 parts of the product was fractionated in the fractionator, and the following fractions collected:

TABLE II

| Fraction | Boiling point | Weight collected, g. |
|---|---|---|
| I | 125 to 135° C. 2 mm | 338.6 |
| II | From 135 to 154° C. 2 mm.–2.5 mm | 39.2 |
| R | Residue, above 155° C. 2.5 mm | 26.9 |

Fraction II corresponded in boiling point to a product containing approximately one mole of propylene per mole of diethylene glycol di-isobutyrate. The residue corresponded in boiling point to the product containing approximately two moles of the propylene per mole of the diethylene glycol di-isobutyrate. Therefore, the reaction proceeded according to the following scheme:

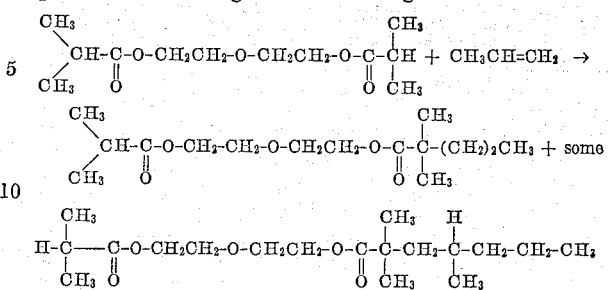

*Example 2*

A solution of 18.3 parts of di-tert-butyl peroxide in 355 parts of diethylene glycol di-iso-butyrate (boiling point 150° C., 5 mm.) was fed concurrently with hot 1-octene vapor through the reactor of FIGURE 1 at a rate of feed of telogen plus free radical initiator of 2.92 parts per minute. The reaction temperature was maintained at 145 to 150° C. After the reactor had become filled with reaction mixture, the feed line was cut off, then the telomer recycle line opened. The telogen-reaction mixture was then recycled for an additional four hours. Olefin was added continuously at the same rate throughout this period. The product was then transferred to the fractionator, and fractionated. The following fractions were collected from 624 parts of crude telomer:

TABLE III

| Fraction | Boiling point | Weight collected, g. |
|---|---|---|
| I | 100–110° C. 1 mm | 139.3 |
| II | 110–190° C. 1 mm.–4 mm | 75.2 |
| III | 190–222° C. 4 mm.–5 mm | 247.7 |
| R | Residue, above 222° C. 5mm | 161 |

Fraction III corresponded approximately to a 1:1 addition product of diethylene glycol di-isobutyrate and 1-octene, and Fraction R to a 2:1 addition product of diethylene glycol di-isobutyrate and 1-octene. Therefore, the reaction proceeded according to the following equation:

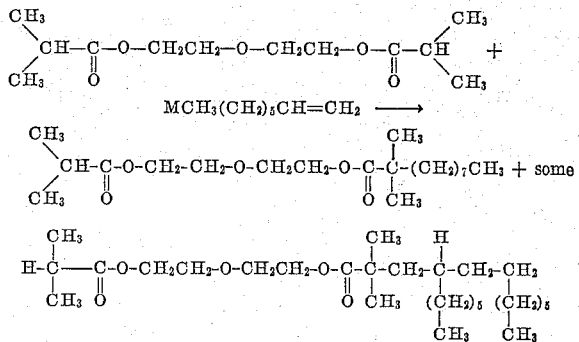

*Example 3*

The reactor of FIGURE 1, packed with porcelain boiling saddles, was filled to a level about two-thirds full with 267 parts of bis(1,3-butanediol) biborate (boiling point 114° C., 0.4 mm.), and 5.35 parts of di-tert-butyl peroxide. The reactor was heated to 139° C. and maintained at 134 to 139° C. for two hours, while 1-hexene vapors were bubbled through the reaction at about 100 parts of vapor per hour. A mixture of 5 parts di-tert-butyl peroxide in 100 parts bis(1,3-butanediol) biborate were then slowly added incrementally over a period of one hour, while additional 1-hexene was bubbled through the reaction mixture. The mixture was then maintained at 134 to 138° C. for an additional hour while bubbling 1-hexene through the reactor. The total reaction time was about four hours.

The crude addition telomer reaction product was drawn off, and the excess 1-hexene and unreacted bis(1,3-butanediol) biborate were stripped off in the fractionator in a pure nitrogen stream at 160° C. under reduced pressure (0.29 mm. of mercury). The pot residue, consisting of a heavy oil, was found to analyze 4.48% boron, corresponding to 1.5 moles of 1-hexene telomerized per 1,3-butanediol unit of the telogen. The product was approximately an equal molar mixture of the 1:1 and 2:1 hexene-borate addition telomers.

Thus, the reaction proceeded according to the following scheme:

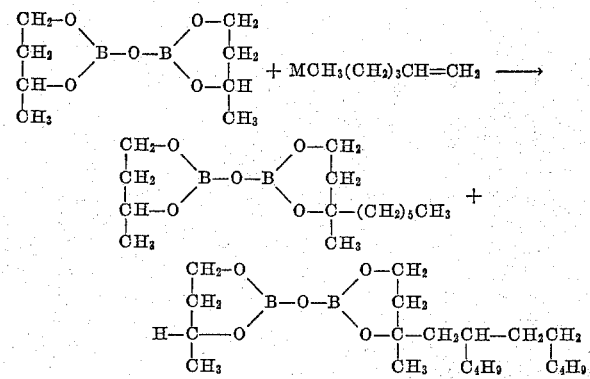

I claim:

1. A process for producing higher homologues of organic telogens containing only atoms selected from the group consisting of carbon, hydrogen, boron, halogen and oxygen and having a labile hydrogen atom, which comprises addition-telomerizing the telogen with from about one to about two moles per mole of an unsatured taxogen having the formula $CR_1R_2=CH_2$, wherein $R_1$ and $R_2$ are selected from the group consisting of hydrogen, and aliphatic, aromatic, and cycloaliphatic radicals having from about one to about sixteen carbon atoms in a molar proportion of organic telogen:taxogen of from about 100:1 to about 1000:1 in the presence of a free radical initiator capable of initiating the telomerization at a temperature below the boiling point of the telogen and at which an evolution of free radicals from the initiator is obtained.

2. A process in accordance with claim 1 in which the temperature is within the range from about 80° to about 200° C.

3. A process in accordance with claim 1 in which the taxogen is ethylene.

4. A process in accordance with claim 1 in which the taxogen is propylene.

5. A process in accordance with claim 1 in which the taxogen is 1-octene.

6. A process in accordance with claim 1 in which the taxogen is 1-hexene.

7. A process in accordance with claim 1 in which the free radical initiator is a dialkyl peroxide.

8. A process in accordance with claim 1 in which the free radical initiator is a di-tert-butyl peroxide.

9. A process in accordance with claim 1 in which the organic telogen is an alkylene glycol borate.

10. A process in accordance with claim 1 in which the reaction temperature is above the boiling point of the said taxogen such that the said taxogen is in the gas phase, and the organic telogen in the liquid phase.

11. A process in accordance with claim 10 in which the organic telogen is in solution in an organic solvent.

12. A continuous process for producing higher homologues of organic telogens containing only atoms selected from the group consisting of carbon, hydrogen, boron, halogen and oxygen, and having a labile hydrogen atom, which comprises continuously adding an unsaturated taxogen having the formula $CR_1R_2=CH_2$, wherein $R_1$ and $R_2$ are selected from the group consisting of hydrogen, and aliphatic, aromatic, and cycloaliphatic radicals having from about one to about sixteen carbon atoms to the organic telogen and reacting the same in the presence of a free radical initiator capable of initiating the telomerization at a temperature below the boiling point of the telogen and at which an evolution of free radicals from the initiator is obtained, continuously supplying said organic telogen plus free radical initiator, if required, to the reaction, maintaining a molar proportion of organic telogen: taxogen of from about 100:1 to about 1000:1 by appropriate adjustment of the addition of said taxogen and organic telogen to the reaction, and continuously separating addition telomer product from the reaction.

13. A continuous process in accordance with claim 12, which includes continuously fractionating crude telomer product, and recovering fractionated telomer.

14. A continuous process in accordance with claim 13, which includes recycling said telogen and taxogen recovered in the fractionation to the reaction.

15. A continuous process in accordance with claim 12 which includes continuously recovering unreacted taxogen, and recycling the same to the reaction.

16. A continuous process in accordance with claim 12, which includes continuously recycling said telomer to the reaction.

17. A continuous process in accordance with claim 16, in which addition of fresh organic compound and free radical initiator is halted while the telomer is being recycled.

References Cited in the file of this patent

UNITED STATES PATENTS

| | | |
|---|---|---|
| 1,247,280 | Keller | Nov. 20, 1917 |
| 1,576,705 | Babcock | Mar. 16, 1926 |
| 2,257,533 | Reich | Sept. 30, 1944 |
| 2,423,497 | Harmon | July 8, 1947 |
| 2,568,859 | Ladd et al. | Sept. 25, 1951 |
| 2,839,564 | Garner | June 17, 1958 |
| 2,884,441 | Groszos | Apr. 28, 1959 |
| 2,975,215 | Ziegler et al. | Mar. 14, 1961 |